2,556,041

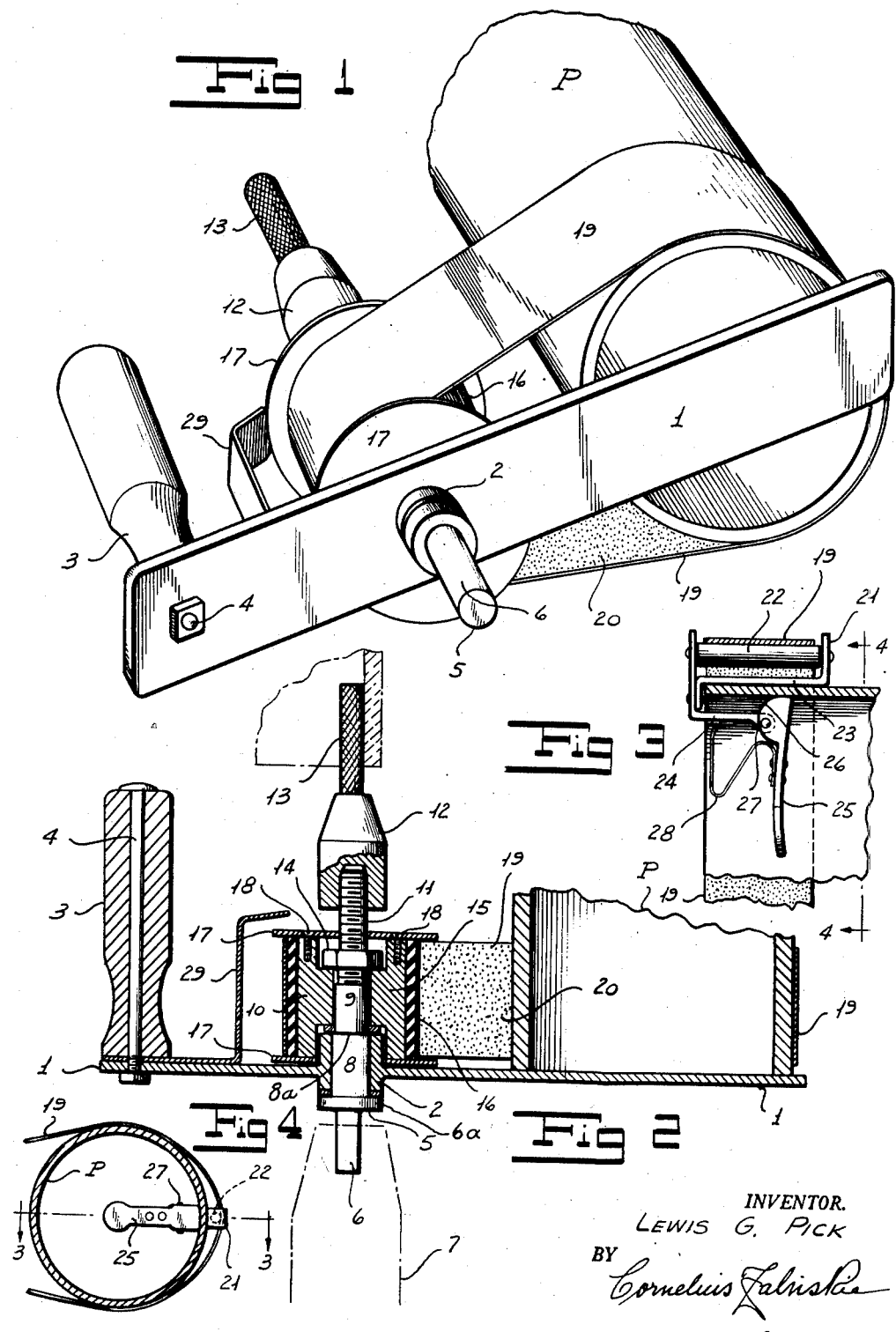
June 5, 1951 — L. G. PICK — 2,556,041
TOOL FOR PREPARING PIPES AND FITTINGS FOR SOLDERED, BRAZED, OR COUPLING ASSEMBLIES
Filed Oct. 25, 1949
INVENTOR.
LEWIS G. PICK
BY Cornelius Falnislai
ATTORNEY Patented June 5, 1951

UNITED STATES PATENT OFFICE 2,556,041

TOOL FOR PREPARING PIPES AND FITTINGS FOR SOLDERED, BRAZED, OR COUPLING ASSEMBLY

Lewis G. Pick, Tuckahoe, N. Y.

Application October 25, 1949, Serial No. 123,362

1 Claim. (Cl. 51—170)

When assembling unthreaded pipe for soldering, brazing or coupling operations, it is necessary to first cut the pipe to the desired length with a hacksaw, rotary cut off tool, or the like which leaves at the cut end of the pipe both external and internal burrs. These must be removed and the exterior surface of the pipe, as well as the interior surface of the fitting, must be thoroughly cleaned and polished in order to obtain satisfactory brazed or soldered joints. Heretofore it has been common practice to remove these burrs through the use of hand manipulated files, reamers, etc., and to clean and polish the surfaces to be united with hand manipulated emery cloth and similar expedients. This takes considerable time and labor by skilled workmen and does not result in an entirely satisfactory job.

The object of the present invention is to provide a power operated tool which will carry out all of these operations in a thoroughly practical and efficient manner and do a much better job than could possibly be done by hand, thereby greatly economizing in man-hours of assembly and assuring a much better joint than heretofore.

Generally speaking, the tool of this invention comprises a guide bar provided at one end with a handle by which it may be held while its other end is adapted to rest against the end of the pipe to be cleaned. The guide bar is provided intermediate its ends with a bearing for a spindle which extends through the bar. The end of the spindle at one side of the bar is adapted to be engaged by a chuck of a driving motor, flexible shaft, or other prime mover, while the end of the spindle at the other side of the bar carries a chuck for holding a cylindrical grinding implement which may be in the nature of an abrasing stone or rat-tail file operable to remove an interior burr on a pipe.

Between the file chuck and the guide bar, the spindle carries a pulley, preferably faced with a soft foam-type rubber sleeve, and about this pulley is looped a belt, the inner surface of which is abrasive in character. This belt is of a length materially exceeding the circumference of the pulley so that the belt may be caused to embrace the exterior of the pipe, while the guide bar is held against the end of the pipe to determine the portion of the pipe to be cleaned. The operator holds the tool in position, as the prime mover operates the pulley to cause the belt to travel over the surface of the pipe, the tool being shifted circumferentially of the pipe through approximately 180° to make sure that all portions of the circumference of the pipe are cleaned.

Features of the invention, other than those adverted to, will be apparent from the hereinafter detailed description and appended claim, when read in conjunction with the accompanying drawing.

The accompanying drawing illustrates one practical embodiment of the invention, but the construction therein shown is to be understood as illustrative, only, and not as defining the limits of the invention.

Figure 1 is a perspective view showing the tool of the present invention.

Figure 2 is a horizontal section through the tool and pipe, said section being taken through the axis of the spindle and the pipe.

Figure 3 shows a spacing device which is preferably used in conjunction with the tool when operating upon pipes of large diameter, said view being a section on the line 3—3 of Figure 4.

Figure 4 is a section taken on the line 4—4 of Figure 3.

In the drawings, 1 designates a guide bar which is preferably in the form of a metal strip provided intermediate its ends with a bearing 2. This strip and bearing may be fabricated by welding or brazing them together or they may be cast in one piece. The guide bar is provided at one end with a handle 3 which may be conveniently secured to the bar by a bolt 4, as shown in Figure 2.

Mounted to rotate in the bearing 2 is a spindle 5. This spindle is mounted in the bearing in any suitable manner and its construction may vary without departing from this invention. However, I have shown, for the purpose of illustration, a stepped spindle, one end of which is reduced at 6 to engage a drive chuck 7 of a prime mover. At the base of the reduced portion 6 is a fixed or integral collar 6a, beyond which a portion 8 extends through the bearing 2. This portion 8 terminates in a shoulder 8a, beyond which another portion 9 extends through a pulley 10. Beyond this portion 9 the spindle is threaded, as at 11, to receive a driven chuck 12 for an abrasive element 13 which conveniently may be a rat-tail file. A nut 14 upon the threaded portion 11 locks the pulley to the spindle so that when the spindle is turned the pulley will turn with it.

The pulley may, in practice, embody a wooden or metal core 15 about which is closely fitted a foam rubber type sleeve 16 and flanges 17 are provided at the opposite ends of the pulley as clearly shown in Figure 2. The inner flange may be loose or secured to the pulley as desired, but the outer flange is preferably secured to the pulley by screws 18 to permit this flange to be readily removed to renew the rubber sleeve in the event that this becomes necessary.

The pulley is adapted to cooperate with a belt 19, the outer surface of which is smooth while the inner surface 20 carries an abrasive, such as emery or the like. The belt is of such length that, when the tool is associated with the pipe P to be cleaned, as indicated in Figures 1 and 2, the belt will embrace both the pipe and the pulley. Various lengths of belt are provided for pipes of appreciably different diameters.

For all but very large pipes, the tool is used as shown in Figures 1 and 2, the guide bar being held against the end of the pipe by the operator, who grasps a handle 3 and so holds the tool in position. The drive chuck 7, engaged with the end portion 6 of the spindle, is driven from any suitable prime mover which may be an electric instrument, such as an electric drill. Such electric instruments are commonly provided with handles, so that such instrument may be held in one hand while the tool of this invention may be grasped and held in place by the other hand of the operator.

The tool is so held as to maintain the belt in engagement with the pipe while the belt is caused to travel about the surface of the pipe with which it contacts and thus thoroughly clean and polish the same and place it in condition for effective soldering or brazing. The tool is preferably not held stationary but is rotated about the axis of the pipe through approximately 180° so that all portions of the circumference of the pipe are cleaned and polished. Experience with this tool has shown that it does the work in a very simple, efficient and expeditious manner, so that even rough pipes may be conditioned for brazing within a few seconds of time.

When operating upon pipes of large diameter, it has been sometimes found that the friction between the pipe and the belt is so great that the belt may slip on the drive pulley. In such cases, I have utilized, in conjunction with the tool, a spacer or friction reliever of the character shown in Figures 3 and 4. This spacer embodies a yoke 21 across which extends a roller 22 of a length somewhat exceeding the width of the belt. The under part of the yoke 23 constitutes a fixed jaw and the yoke has an extension 24 to which is pivoted, on a pin 27, a movable jaw 25 having a cam surface 26. A spring 28 urges the jaw 25 into a position to grip the pipe positioned between it and the fixed jaw. When the spacer shown in Figures 3 and 4 is secured to a pipe, as therein indicated, the belt does not engage with so great a portion of the circumference of the pipe as it rides for an appreciable portion of the circumference of the pipe over the roller 22 and the belt is thus easier to operate. When using this spacer a portion of the surface of the pipe is cleaned and then the spacer is moved by hand so as to permit cleaning of further portions of the pipe successively. To protect the hand of the operator during the operations of the device I may associate therewith a guard 29, clamped between the handle and the guide bar and extending around the adjacent side of the pulley as shown.

There are times when it is necessary to remove a burr or a nick from the interior of the pipe or fitting. The abrasive element 13 is used for this purpose. This element 13 may be in the form of a stone, rat-tail file or other abrasive device or grinder and it is employed as indicated in Figure 2. During its use the belt is preferably removed.

The tool of this invention has been satisfactorily employed for cleaning, polishing and grinding cylindrical surfaces of other articles than pipes, but is primarily adapted for use in the pipe field. Ordinarily a relatively fine abrasive is used on the interior surface of the belt, and a relatively fine abrasive is used for the implement 13, although coarser abrasives have been successfully employed where piping and fittings have been found to be over or under size and it was necessary to remove some material in order to obtain a proper fit.

An important feature of this invention is found in its simplicity. It may be economically manufactured and, aside from the abrasive parts of the tool which are readily replaceable, the parts are such that they will wear indefinitely. Moreover, experience with this tool has shown that it does a better job than could possibly be done by hand.

The foregoing detailed descriptions sets forth the invention in its preferred practical form, but the invention is to be understood as commensurate with the appended claim.

Having thus fully described the invention, what I claim as new and desire to secure by Letters Patent is:

A device for preparing the exterior surface of the extreme end portion of a pipe for brazing or soldering comprising: a guide bar, a driving spindle journalled for rotation on and intermediate the ends of the guide bar with its axis normal to the bar and parallel to the axis of the pipe, a pulley fixed on the driving spindle on the same side of the guide bar as the pipe, and an internal abrasive belt to embrace the pulley and the pipe with the guide bar extending radially of the pulley a distance greater than the span of the belt to abut the end of the pipe and thus localize the action of the belt on the pipe at a predetermined zone longitudinally of the pipe when the belt is drawn tightly about the pipe and pulley by bodily movement of the pulley and bar in a direction radially away from the pipe.

LEWIS G. PICK.

REFERENCES CITED

The following references are of record in the file of this patent:

UNITED STATES PATENTS

| Number | Name | Date |
|---|---|---|
| 395,720 | Starr | Jan. 8, 1889 |
| 1,502,136 | Dake | July 22, 1924 |
| 1,773,077 | Newman | Aug. 12, 1930 |
| 1,908,048 | Player et al. | May 9, 1933 |
| 2,279,783 | Fowler | Apr. 14, 1942 |
| 2,483,720 | Asbury | Oct. 4, 1949 |

FOREIGN PATENTS

| Number | Country | Date |
|---|---|---|
| 13,061 of 1928 | Australia | May 14, 1929 |